United States Patent
Pleasants

[11] Patent Number: 5,103,585
[45] Date of Patent: Apr. 14, 1992

[54] CRICKET GUN

[75] Inventor: John P. Pleasants, 3385 Brownbark, Memphis, Tenn. 38115

[73] Assignee: John P. Pleasants, Memphis, Tenn.

[21] Appl. No.: 579,658

[22] Filed: Sep. 10, 1990

[51] Int. Cl.⁵ .............................................. A01K 97/04
[52] U.S. Cl. ....................................................... 43/55
[58] Field of Search .......................... 43/54.1, 55, 4; 221/256, 309; 222/510, 450

[56] References Cited

U.S. PATENT DOCUMENTS

| | | | |
|---|---|---|---|
| 2,478,621 | 8/1949 | Attula | 43/55 |
| 3,141,579 | 7/1964 | Medlock | 222/450 |
| 3,308,570 | 3/1967 | Horton | 43/55 |
| 4,030,226 | 6/1977 | Shelton, Sr. et al. | 43/55 |
| 4,110,931 | 9/1978 | Maness | 43/55 |
| 4,158,267 | 6/1979 | Farnsworth | 43/55 |
| 4,207,993 | 6/1980 | Ellis, Sr. et al. | 43/55 |
| 4,989,362 | 2/1991 | Joyner | 43/55 |

FOREIGN PATENT DOCUMENTS 969670 12/1950 France .................................. 43/55

Primary Examiner—Richard K. Seidel
Assistant Examiner—Jeanne M. Elpel

[57] ABSTRACT

"Cricket gun" can be used by fishermen to dispense live insects such as crickets. The cricket gun includes a bait container for holding a limited supply of crickets with a bait dispensing head attached to the funnel end of the cage. On the opposite end of the cage is a spring loaded handle, by compressing this handle a cricket is allowed to enter and be entrapped in the dispenser head chamber. The cricket may be discharged by pulling back on the release trigger. When the release trigger is pulled back the carriage is pulled forward allowing the cricket to fall out the bottom of the dispenser head. When the trigger is released the spring loaded carriage is pulled back into position. The cricket gun allows a fisherman to discharge one insect at a time or keep one in reserve in the isolated chamber for later use.

1 Claim, 4 Drawing Sheets

CRICKET GUN

This invention "CRICKET GUN" relates generally to fishing needs and insect dispensing devices.

DESCRIPTION OF THE PRIOR ART

Probably the most common used insect bait container is the spherical, tubular shaped type. Crickets are usually put in at one end and discharged out of the other end. This type bait container is usually equipped with a cork or rubber stopper to prevent insect loss. These type dispensers are not very reliable. If a fisherman doesn't put the cork in correctly many insects may be lost. Quite often when fish are biting well, a fisherman may forget to put the cork back in place, this is not only a loss of bait, but a loss of fishing time. This type of cage also requires both hands to discharge a cricket. When a cricket is discharged it is very difficult to put the cork back into place without releasing more crickets. Sometimes the cricket that was captured to go onto the hook gets away also. It is desired to provide a means for accomplishing an end to this problem.

SUMMARY OF THE INVENTION

The present condition stands to overcome some of the disadvantages of the previous types of cricket containers. The cricket gun will allow one cricket to be discharged at a time. The cricket gun also allows one to load and unload crickets with one hand. The cricket gun is designed not to injure crickets. The loading handle is spring loaded and attached to the cricket cages loading cap. A hole is drilled through the cap and handle, through this runs a spring loaded operating rod equipped with a cork on one end and a rod stop on the other. When the loading handle is compressed, the handle catches the rod stop and pulls back on the rod. Then the cork opens up the inlet chamber and allows a cricket to enter. When the loading handle is released, the spring loaded rod pushes the cork back over inlet of chamber. If a cricket gets caught under the cork, the insect won't be injured due to the lightweight operating rod spring. The operating handle and the operating rod work totally separate. A cricket may be released out of the chamber by pulling rearward on the cricket discharge release trigger. The cable is tied to the eye on front of the trigger rod. Then the cable is threaded through two eyes, a spring, another eye, over a small pulley and then tied to the eye nearest the pulley. This pulls the carriage forward on the slide and the cricket falls out the bottom of the discharge port. When the trigger is released the spring loaded carriage pulls the cable forward, thus pulling the trigger forward also. The chamber has a screened mesh on top, this gives an eye view to see when a cricket has entered the chamber, also helps the fisherman to know when to release the loading handle. There is a piece of screen mesh on the inside of the carriage slide which is the end of the chamber. This also makes the cricket run toward the light and makes it easier to be entrapped into the chamber. The trigger has a guide to keep it stationary and guide clips which helps it to travel in a straight line. One advantage of the cricket gun is being able to have a cricket chambered for later use. Cricket Gun is easy to use and is also a lot of fun. After many hours of use, I have found that I catch more fish by keeping the hook baited.

DESCRIPTION OF THE PREFERRED EMBODIMENTS

Figure 1:
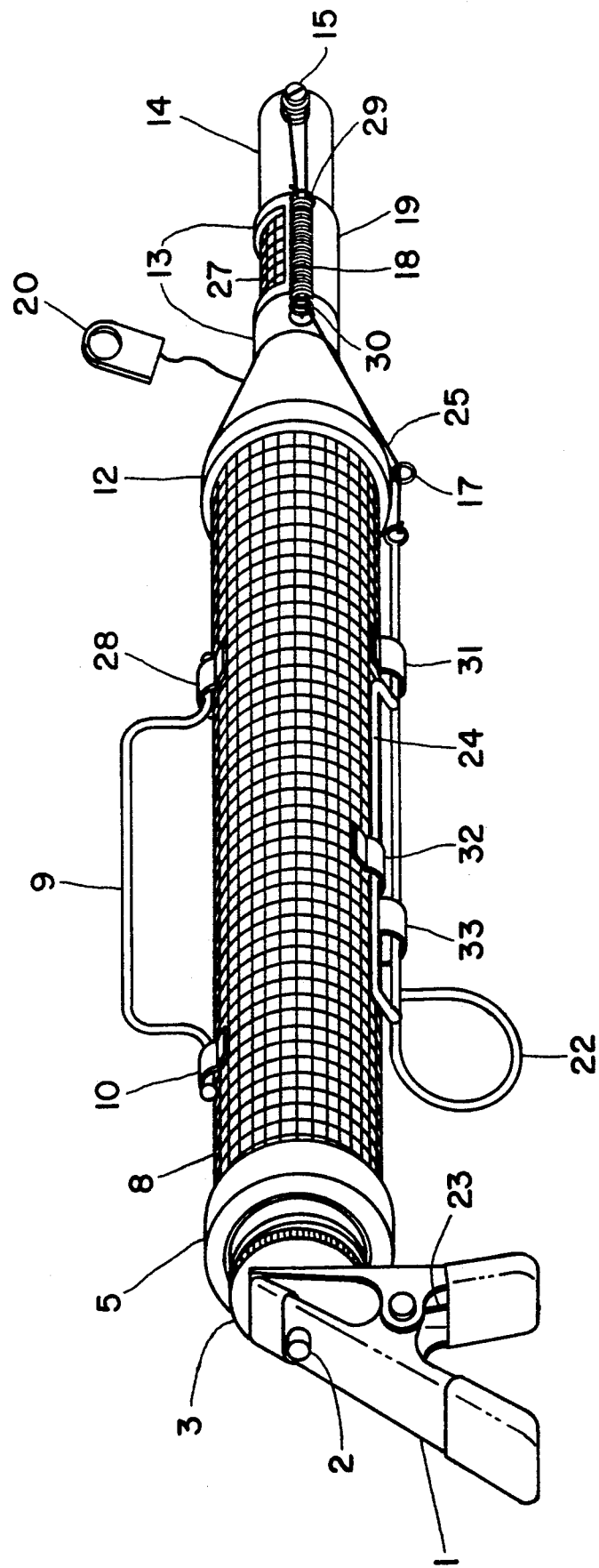
FIG. 1—A overall view of the cricket gun mostly exterior details.
Figure 2:
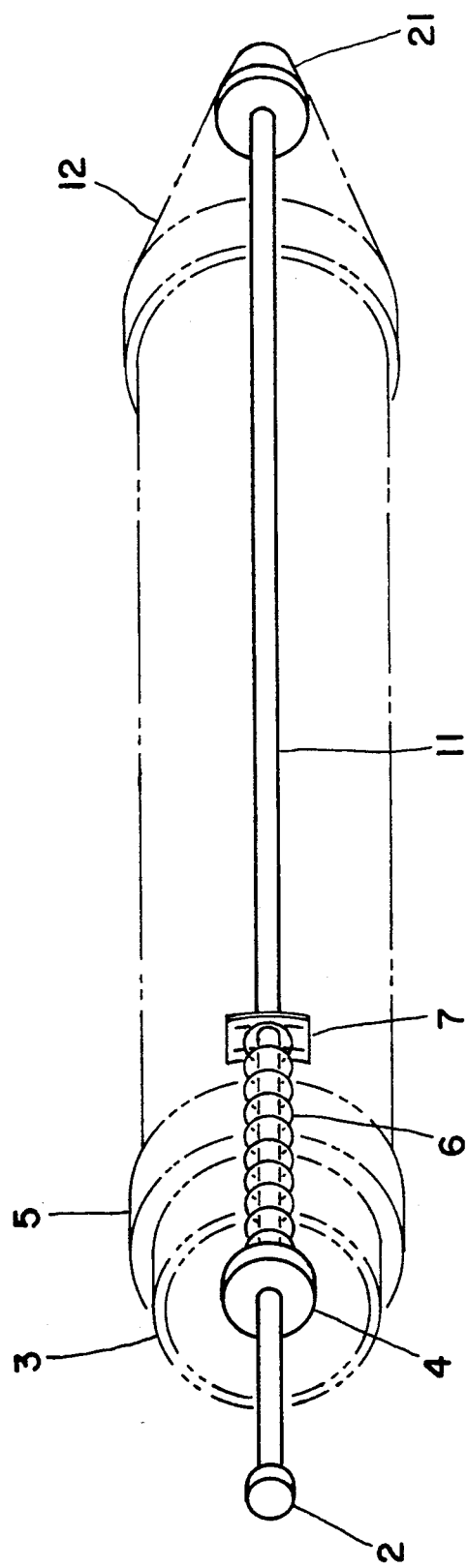
FIG. 2—A inside view of the operating rod, spring, inlet chamber cork, loading screw cap and rod stop.
Figure 3:
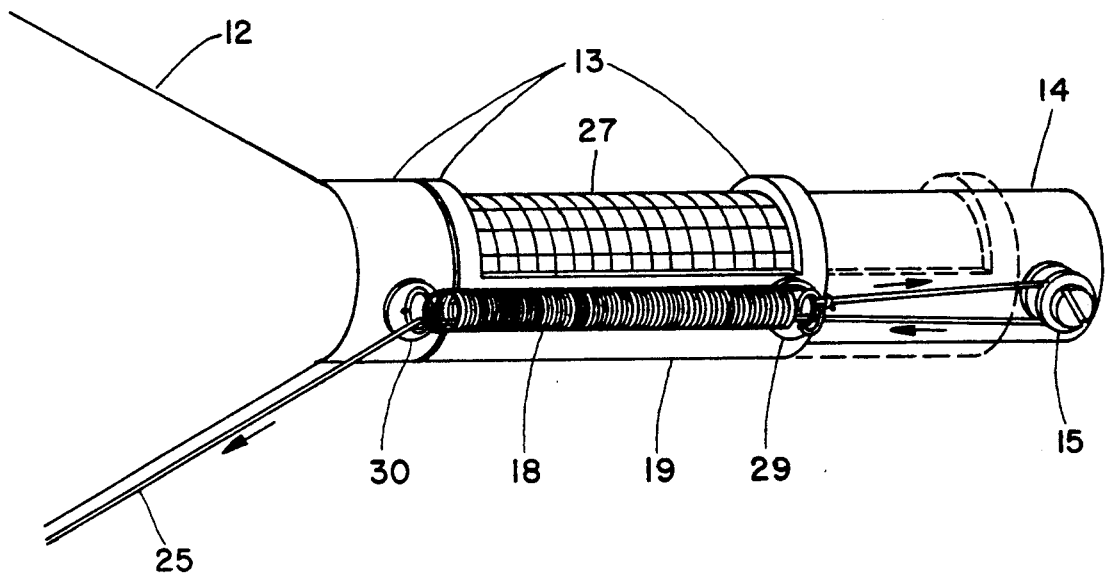
FIG. 3—This is the chambered end of FIG. 1, this shows how carriage slides forward with a blown view of spring and mechanics.
Figure 4:
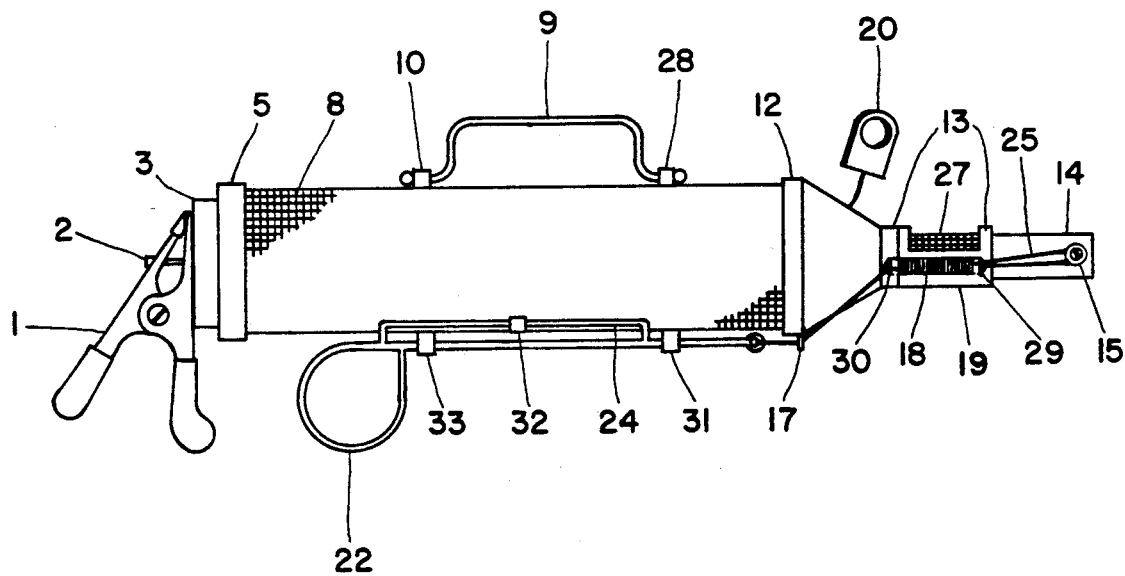
FIG. 4—Side view of all parts of the cricket gun.
Figure 5:
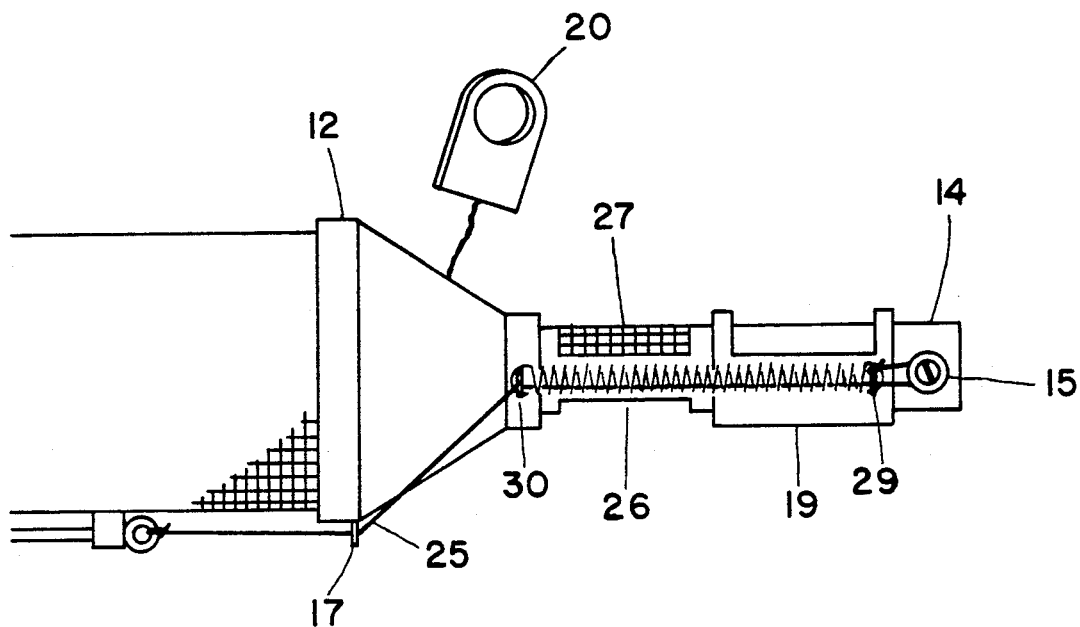
FIG. 5—Shows chambered end of the cricket gun with discharge port open.
Figure 6:
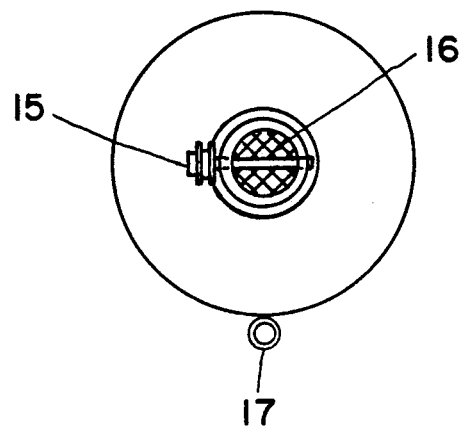
FIG. 6—Shows front end view with pulley and pulley rod. Also shows screen mesh behind pulley near carriage.

Referring to FIGS. 1-6 of the drawings, loading handle 1 is a clamp type handle used primarily to load chamber 13. Loading handle 1 is equipped with handle spring 23, a single strength spring used in giving tension to loading handle 1. The side of loading handle 1 that is attached to threaded loaded cap 3 is flat for good flush mounting. Loading handle 1 has a hole drilled through both sections in a straight line while in a closed position. The hole in loading handle 1 and threaded loading cap 3 are slightly larger than operating rod 11 diameters to insure smooth operation. The hole in loading handle 1 is slightly smaller than rod stop 2. Threaded loading cap 3 had female threads that screws onto a male threaded section which is attached to the rear cage body 5. Spring 6 is low tension that operating rod 11 runs through. The spring 6 operates the rod portion only and spring stop clip 7 is designed to slide only one way on operating rod 11. Rubber washer and metal washer 4 are inserted by operating rod 11. Rubber washer and metal washer keeps the spring from digging into the threaded loading cap 3, also rubber washer 4 prevents unnecessary noise and smooth operation. Screen mesh 8 covers from the rear cage body 5 to the front cage body 12. Again no claims are being made on the existing cricket tube. Handle bracket 10 and handle bracket 28 are metal brackets attached to screen mesh 8 which are used to support a metal swinging handle 9. Cork 21 attached to end of operating rod 11 is basically similar to bathroom tapered faucet washer. Cork 21 is attached to operating rod by a small brass sleeve. Cork 21 is the inlet chamber door which allows crickets to be trapped in chamber 13 and to be discharged one at a time. Chamber 13's chamber perimeters are approximately one inch long. Chamber 13 is measured from the cork 21 to screen on inside slide 16. Screen on inside slide 16 is approximately ⅛ inch mesh on the inside the carriage slide 14. The chamber 13 also has a piece of ⅛ inch mesh on top of for visual contact of insects entering chamber which is visual opening of chamber 27. Carriage slide 14 is used as a slide and guide for carriage 19, small pulley 15 is as far as carriage 19 can move on carriage slide 14. The cricket discharge release trigger 22 is used for removing crickets out of cricket discharge port 26. Cricket discharge release trigger 22 has two support brackets trigger bracket 31, trigger bracket 33, also cricket discharge release trigger 22 has trigger guide rod 24. Trigger guide rod 24 has a trigger guide bracket 32 which helps keep the cricket discharge release trigger stable. Cricket discharge release trigger 22 has an eye attached to the end, operating cable 25 is attached to this. Operating cable 25 has to be strong, flexible and small in diameter. This allows a smaller carriage tension spring 18 to be used. Operating cable 25 is threaded through small eye screw 17, front cage body eye and spring support 30, carriage tension spring 18, carriage eye and spring support 29 under and over small pulley 15 back to carriage eye and spring support 29. Carriage eye and spring support 29 is the only bracket attached to carriage 19. When cricket discharge release trigger is pulled rearward carriage eye and spring support 29 is pulled forward stretching carriage tension spring 18, moving carriage 19 forward, leaving cricket discharge port 26 open for cricket discharge. When cricket discharge release trigger 22 is released cricket discharge port 26 is closed, carriage tension spring 18 pulls carriage 19 back into place, thus pulling the cricket discharge release trigger 22 back into position. Loading stop 20 is used as a chamber 13 block during loading crickets into cage. During loading, loading stop 20 is located between carriage 19 and cork 21. The spring loaded carriage 19 will hold loading stop 20 in place until crickets have been loaded. Threaded loading cap 3 is unscrewed to dump crickets into cage.

I claim:

1. A cricket gun for holding and dispensing crickets comprising a holding container and an intergral chamber with dispensing means; said holding container comprising a removable cap at one end, and a funnel at the opposite end with a wide portion of the funnel intergral with the holding container, a rod inside the holding container, a cork attached to a first end of the rod inside the holding container, and the opposite end extending through the removable cap and attached to a handle; a narrow portion of said funnel having an opening and including a chamber, said dispensing means adjacent said chamber and including a sliding carriage and a trigger;

whereby said cork abutts the funnel to keep crickets in the holding container, said handle is operated to displace the rod and cork allowing a cricket to enter the chamber and then the trigger is operated to slide the carriage to expose the opening, thereby releasing a cricket.

* * * * *